(12) United States Patent
Zwarts et al.

(10) Patent No.: US 8,534,924 B2
(45) Date of Patent: Sep. 17, 2013

(54) WHEEL BEARING UNIT

(75) Inventors: Jacobus Zwarts, Nieuwegein (NL); Cornelius Petrus Antonius Vissers, Den Dungen (NL); Laurens Verhulst, Utrecht (NL); Jan Hendrikus Kapaan, Nieuwegein (NL)

(73) Assignee: Aktiebolaget SKF, Göteborg (SE)

( * ) Notice: Subject to any disclaimer, the term of this patent is extended or adjusted under 35 U.S.C. 154(b) by 241 days.

(21) Appl. No.: 13/056,037

(22) PCT Filed: Jul. 26, 2008

(86) PCT No.: PCT/EP2008/006173
§ 371 (c)(1),
(2), (4) Date: Apr. 15, 2011

(87) PCT Pub. No.: WO2010/012283
PCT Pub. Date: Feb. 4, 2010

(65) Prior Publication Data
US 2011/0187179 A1 Aug. 4, 2011

(51) Int. Cl.
*F16C 19/18* (2006.01)
*B60B 27/00* (2006.01)

(52) U.S. Cl.
USPC .......................... 384/544; 384/589; 301/105.1

(58) Field of Classification Search
USPC ................... 384/544, 589; 301/124.1, 105.1
See application file for complete search history.

(56) References Cited

U.S. PATENT DOCUMENTS

| 5,333,939 | A | * | 8/1994 | Krude et al. | 301/124.1 |
| 5,590,967 | A | * | 1/1997 | Kapaan | 384/448 |
| 7,922,262 | B2 | * | 4/2011 | Savarese et al. | 301/105.1 |
| 8,029,195 | B2 | * | 10/2011 | Seo et al. | 384/544 |
| 2004/0017104 | A1 | * | 1/2004 | Fakhoury et al. | 301/105.1 |
| 2005/0018939 | A1 | * | 1/2005 | Niwa et al. | 384/544 |
| 2006/0244303 | A1 | * | 11/2006 | Savarese et al. | 301/35.627 |

FOREIGN PATENT DOCUMENTS

| DE | 4023016 | A1 | 1/1992 |
| EP | 0653315 | A1 | 5/1995 |
| EP | 1347190 | A1 | 9/2003 |
| EP | 1717063 | A1 | 11/2006 |
| GB | 2109874 | A | 6/1983 |
| WO | WO2008000283 | A1 | 1/2008 |

* cited by examiner

*Primary Examiner* — Thomas R Hannon
(74) *Attorney, Agent, or Firm* — Bryan Peckjian; SKF USA Inc. Patent Department

(57) ABSTRACT

The invention relates to a wheel bearing unit (1) for a vehicle wheel, comprising a hub element (2, 3) which has a axially (a) extending cylindrical section (4) to be supported by a bearing arrangement (5) and which has a radially (r) extending flange section (6) for fixing the vehicle wheel and/or a brake disk at a face side (7) of the flange section (6). To ensure a simple design with high stability the invention is characterized in that the hub element (2, 3) consists of a first part (2) comprising the cylindrical section (4) and the flange section (6) and of a second part (3), wherein the second part (3) has means (8) for centering a wheel rim of the vehicle wheel and/or the brake disk and wherein the first part (2) and the second part (3) are connected by connection means (9).

13 Claims, 3 Drawing Sheets

WHEEL BEARING UNIT

TECHNICAL FIELD

The invention relates to a wheel bearing unit for a vehicle wheel, comprising a hub element which has an axially extending cylindrical section to be supported by a bearing arrangement and which has a radially extending flange section for fixing the vehicle wheel and/or a brake disk at a face side of the flange section.

BACKGROUND

A wheel bearing unit of this kind is shown for example in WO 2008/000283 A1. Here a cylindrical sleeve element forms a part of the wheel bearing unit and is supported by a two-row angular contact ball bearing. Radially extending flange elements are formed at the cylindrical sleeve element to support a brake disk which can thus be fixed at the hub element. A vehicle wheel is then mounted by attaching it at one of the face sides of the brake disk.

This previously known design of a wheel bearing unit is quite complex and is expensive to produce.

SUMMARY OF THE INVENTION

According to the invention, a design for a wheel bearing unit is suggested, which is suitable to support a brake disk and/or a vehicle wheel. The wheel bearing unit comprises a hub element which has an axially extending cylindrical section, which is arranged to be supported by a bearing arrangement. Furthermore, the hub element has a radially extending flange section for fixing the vehicle wheel and/or the brake disk at a face side of the flange section.

It is an object of the invention to propose a design of such a wheel bearing unit which consists of parts which can easily be manufactured and can thus be produced in an inexpensive manner. In addition, the wheel bearing unit should be easy and quick to assemble, to further enhance the cost savings. Finally, the wheel bearing unit should have a compact and stiff structure, so that the forces from the wheel can be taken up without excessive deformation of the wheel bearing unit.

A solution according to the invention is characterized in that the hub element consists of a first part comprising the cylindrical section and the flange section and of a second part, wherein the second part has means for centering a wheel rim of the vehicle wheel and/or the brake disk and wherein the first part and the second part are connected by connection means.

The means for centering are preferably formed by a plurality of flaps extending in an outboard axial direction. The second part can have a plurality of connection sections, which extend in radial direction, wherein the connection means couple the connection sections of the second part to corresponding receiving sections on the radially extending flange of the first part. A preferred embodiment of the invention has a design, where the flaps extending in axial direction and the connection sections extending in radial direction are arranged alternately in the circumferential direction of the second part.

The first part as well as the second part can consist of sheet metal. In this case, the flaps and/or the connection sections can be formed by bending a sheet metal base part.

To increase the stiffness of the hub element, the face side of the flange section can have axially prominent ribs, which also serve as a contact surface for the vehicle wheel/wheel rim and/or the brake disk. Between the ribs, axially recessed areas are arranged in circumferential direction, and the connection sections of the first part are arranged in the recessed areas. In this design the face side of the ribs and the face side of the connection sections can be in a common plane. Suitably, the number of ribs is at least equal to the number of connection points between the flange and the wheel rim and/or brake rotor.

For the fixation of the wheel rim and/or brake disk to the flange section, the connection points can be mounting holes through which stud bolts are pressed. If ordinary bolts are applied, the connection points can be threaded holes or holes provided with threaded inserts.

A beneficial embodiment of the proposed wheel bearing unit has a design in which the axially extending cylindrical section of the first part of the hub element has a radially extending end section, which forms an axial stop for a rotating bearing ring of the bearing arrangement at the inboard end of the bearing. The second part can have an axially extending cylindrical section that forms an axial stop for the rotating bearing ring of the bearing arrangement at the outboard end of the bearing. By this design, the rotating bearing ring of the bearing arrangement can easily be axially fixed relatively to the hub element, when the first and the second part of the hub element are connected.

The connection means for connecting the first and the second part can be mechanical fasteners, such as rivets or screws; furthermore, the connection can be made by means of energy welding, e.g. laser welding, soldering or brazing, so that the connection means would be a weld seam.

For applications with bearing outer ring rotation, the bearing arrangement has at least one outer ring which can rotate relatively to at least one inner ring, wherein the at least one inner ring is arranged to be stationary. A bearing arrangement adapted for inner ring rotation is also possible The bearing arrangement is preferably a double row angular contact bearing. Both rows of rolling elements can be balls, flattened balls or rollers, or a combination of rolling elements can be used, e.g. a first row of balls and a second row of tapered rollers. Furthermore, the pitch diameter of the two rows can be equal or different in magnitude.

The invention is preferably applied for wheel bearing units which are non-driven, but a driven version can also be considered. Furthermore, bearing units with a rotating bearing outer ring are preferred.

The second part of the hub element, which can also be designated as a spigot, has basically three functions: The part of the spigot for centering, i.e. the axially extending flaps, make is easy to center the brake disk as well as the wheel rim during the mounting process. Furthermore, the connection sections are formed as lips which are bent radially outwards and which contact the recessed areas of the hub flange, thereby enhancing the stiffness of the design concept. Finally, the second part has a cylindrical section that extends in an inboard axial direction, which serves as a stop to axially lock the rotating bearing ring of the bearing arrangement at the outboard side of the bearing.

Both parts of the hub element are preferably made of sheet metal with a thickness of between 2 and 8 mm. The sheet metal can be a low-carbon ferrous metal such as steel, or a non-ferrous metal such as aluminium. Low-carbon sheet metal is advantageous in view of its weldability and cold-formability. The sheet metal can also comprise a combination of ferrous and non-ferrous metal.

The parts can be manufactured according to known technologies. For example, the first and second part can be stamped out from a disk-shaped basis element. With regard to the second part, the radially extending connection sections can then be brought to the desired position by a bending process. The axially extending flaps (means for centering) can be finished to the desired diameter to fulfill the task of centering of the brake disk and the wheel rim.

In some embodiments, the first and/or second part of the hub element is provided with a coating to protect the parts against corrosion during service conditions. The coating may consists of a sacrificial metal, e.g. a zinc coating, to provide the parts of the hub element with cathodic protection. A passive, corrosion-preventing coating is also possible.

BRIEF DESCRIPTION OF THE DRAWING

The drawings show an embodiment of the wheel bearing unit according to the invention.

DETAILED DESCRIPTION OF THE INVENTION

Figure 1:
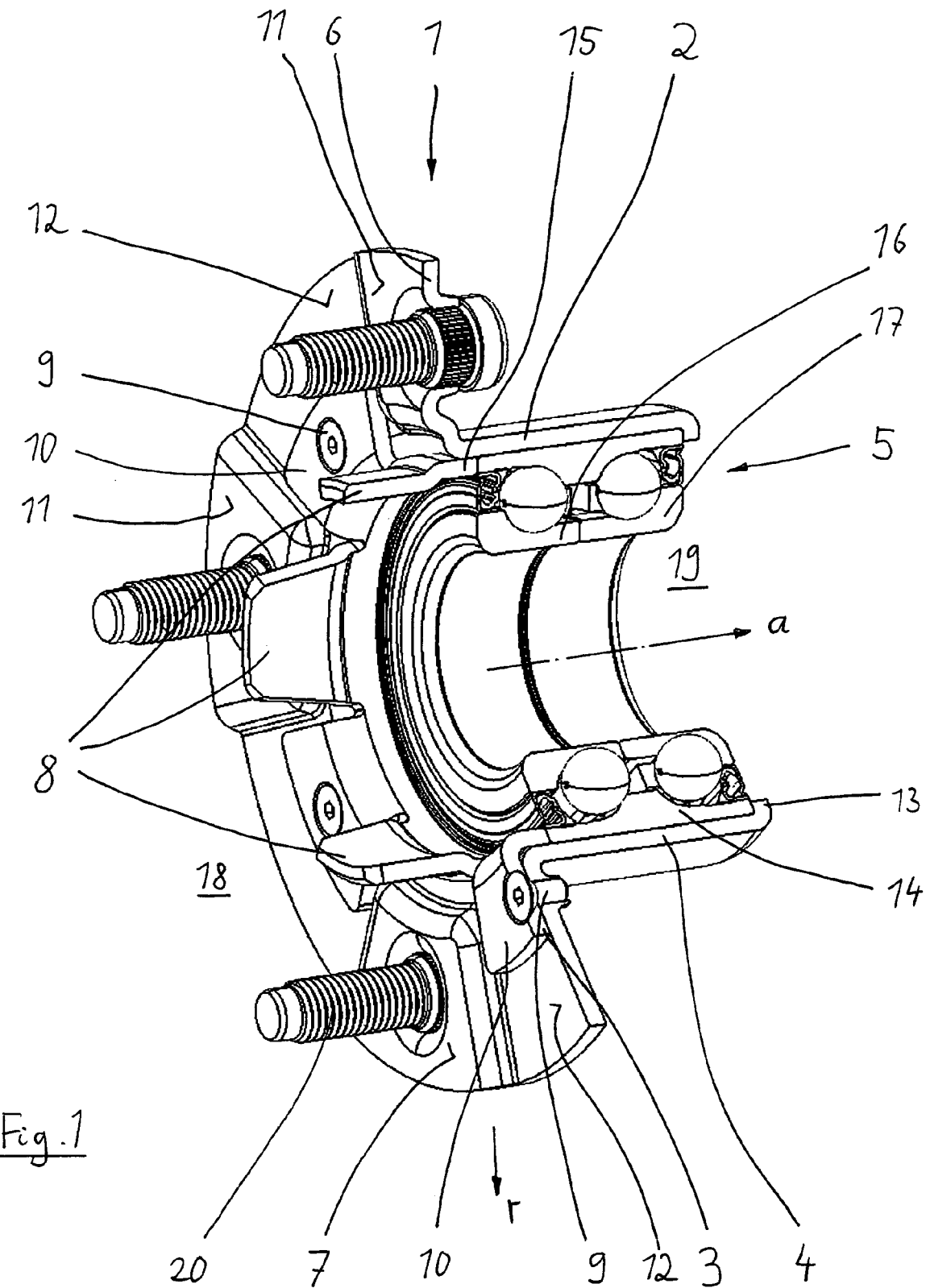
FIG. 1 shows a perspective view of a wheel bearing unit without brake disk and without wheel, which is partially cut away.

FIG. 1 shows a wheel bearing unit 1 which is used to support a vehicle wheel (not shown) relatively to an axle (also not shown). The vehicle wheel would be in the space marked with the reference numeral 18. The axle would be in the space marked with the reference numeral 19.

The wheel bearing unit 1 consists substantially of a hub element 2, 3 and a bearing arrangement 5 which supports the hub element 2, 3, i.e. the hub element 2, 3, can rotate but it is supported without any possibility of movement in axial (a) and radial (r) direction. In the depicted embodiment the bearing arrangement 5 is a double-row annular contact ball bearing with a single outer ring 14 with two raceways and two inner rings 16 and 17, where the raceways are equal in diameter. Here, a non-driven application is shown where the outer ring of the bearing arrangement is rotating and the inner rings are stationary.

Figure 2:
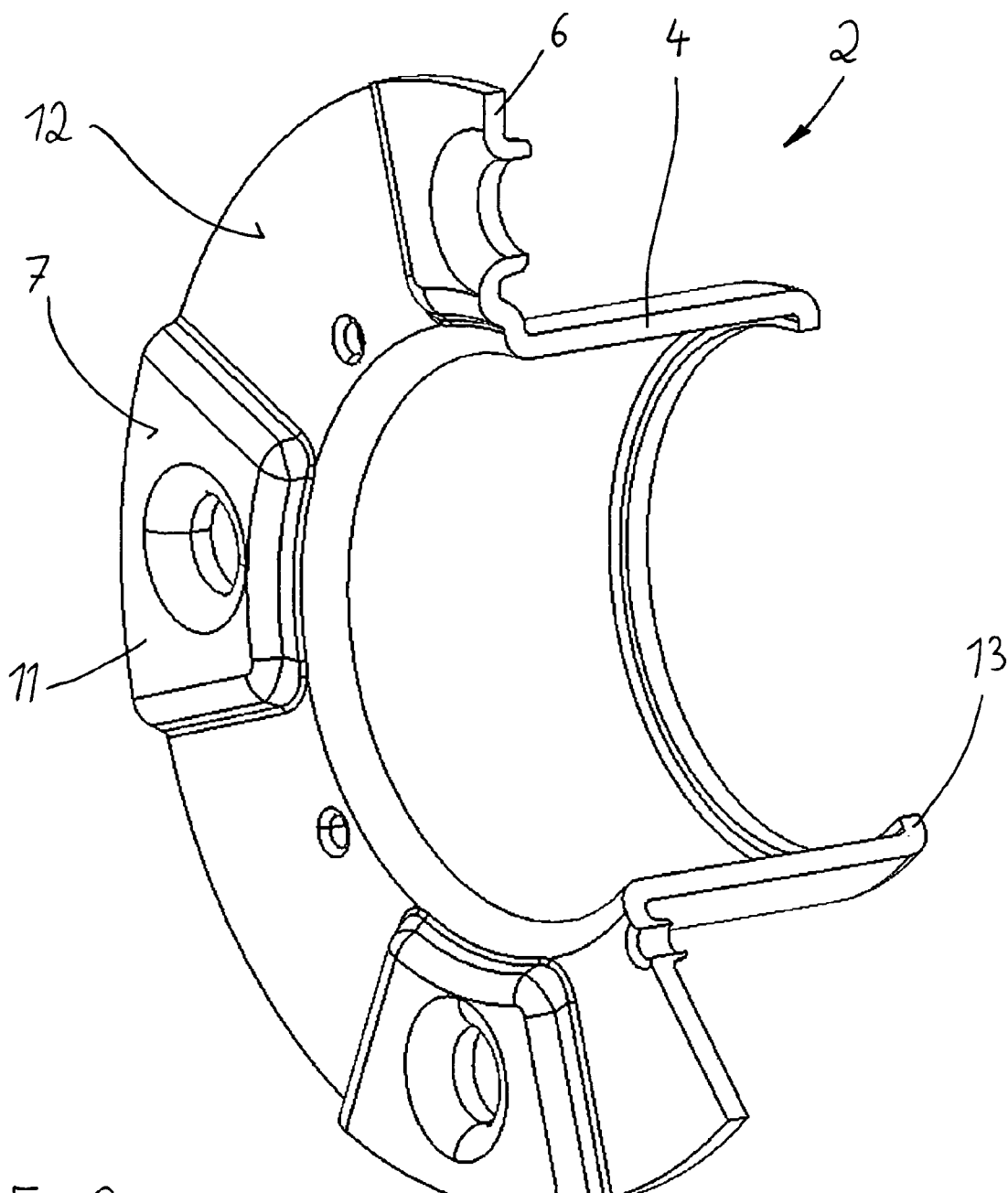
FIG. 2 shows a perspective view of a first part of a hub element of the wheel bearing unit according to FIG. 1

The hub element 2, 3 consists of two parts, namely a first part 2 and a second part 3. Both parts are shown isolated in FIGS. 2 and 3 respectively. The first part 2 has a cylindrical section 4, i.e. a sleeve section, extending in axial direction a. Furthermore, the first part 2 has a radially extending flange section 6. The whole first part is made from sheet metal, which is formed as shown in the figure by means of plastic deformation, e.g. cold pressing.

The flange section 6 has a face side 7 against which a brake disk and the wheel rim is mounted in a known manner.

For centering the brake disk and the wheel rim relatively to the hub element 2, 3 and for fixing the bearing ring 14 in axial direction (a) relatively to the hub element 2, 3 the following provision is made:

The second part 3 of the hub element 2, 3 is also a sheet metal part which is made from a sheet metal disk which is punched out so that the necessary form remains. More specifically, the second part 3 has a plurality of axially extending flaps 8 forming means for centering. Furthermore, the second part 3 has a plurality of connection sections 10 which are bent to extend in radial direction r. Finally, the second part 3 has an axially extending cylindrical section 15 at a side opposite from the side where the centering means 8 are located.

Thus, when the second part 3 is brought into the position relatively to the first part 2 as shown in the figure, simultaneously different tasks are fulfilled: The radially extending connection sections 10 can be used to establish a stiff connection between the parts 2 and 3 when connection means 9 are used to connect the flange section 6 of the first part 2 and the connection section 10 of the second part 3.

When the connection between the two parts 2 and 3 is established, the means 8 for centering extend axially in the right position to center the brake disk and the wheel rim when those parts are mounted on the hub element 2, 3.

Furthermore, the cylindrical section 4 of the first part 2 has a radially extending end section 13 forming a dead stop for the bearing outer ring 14. So, after the second part 3 is connected with the first part 2, the outer ring 14 is locked in axial position, because the axially extending cylindrical section 15 of the second part 3 presses with its end face against the face side of the outer ring 14.

To increase the stiffness of hub element and obtain a plane surface on which the brake disk and the wheel rim can rest, the flange section 6 of the first part 2 has a plurality of axially prominent ribs 11 to which the brake disk and/or the wheel rim are bolted. Between the ribs 11, axially recessed areas 12 are arranged on the face side 7 of the flange section 6. The recessed areas 12 provide a contact area for the connection sections 10 of the second part 3.

The depth of the axial recess of the recessed areas 12 relative to the ribs 11 can be the same as the thickness of the connection section 10, so that after the connection of the first part 2 and the second part 3, also the face surfaces of the connection sections 10 form a contact area for the brake disk and/or the wheel rim. The depth of the axial recess and the bending pitch of the ribs can be varied, depending on the stiffness required.

The brake disk and/or the wheel rim are fixed to the hub element 2, 3 by means of stud bolts 20 which are pressed into the flange section 6 and fix the brake disk and/or the wheel rim firmly to the flange section 6.

Figure 3:
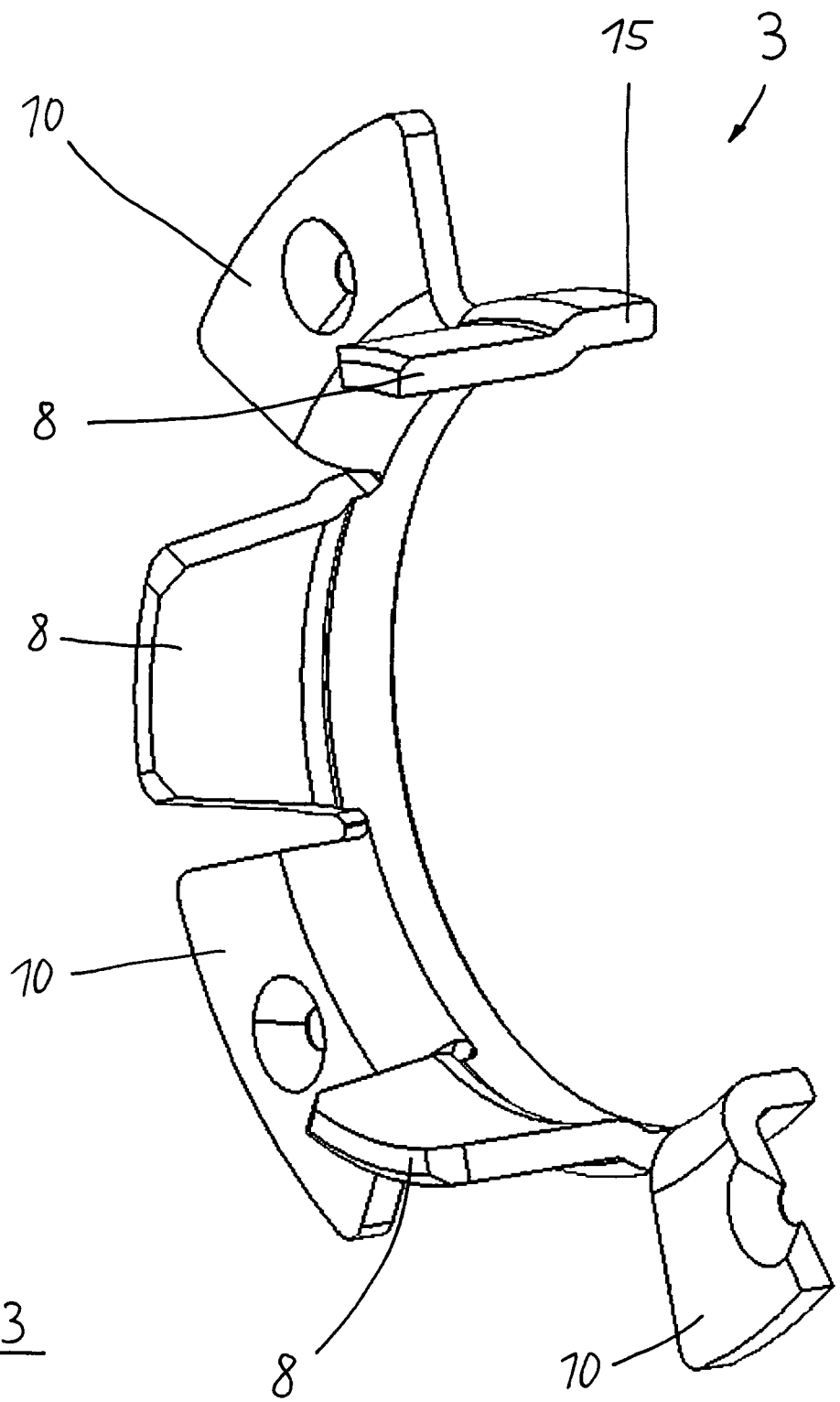
FIG. 3 shows a perspective view of a second part of a hub element of the wheel bearing unit according to FIG. 1.

As can be seen from FIGS. 1 and 3, axially extending flaps 8 for centering and radially extending connection sections 10 alternate around the circumference of the spigot part 3. Four flaps 8 and four connection sections 10 are provided in the depicted embodiment, but this number can vary depending on the number of stud bolts used in the application and the bending stiffness required.

For the connection between the first and the second part 2, 3 of the hub element any suitable means can be employed. The depicted embodiment uses screws, but also rivets can be used. Alternatively, the connection between the two parts 2, 3 can be established by an energy welding process such as laser welding.

The bearing arrangement 5 can be sealed in a known manner to obtain a wheel bearing unit with a long service life and minimal maintenance requirements. The bearing arrangement can also be provided with one more sensors, to detect operating parameters such as speed, load and or vibration.

REFERENCE NUMERALS

1 Wheel bearing unit
2, 3 Hub element
2 First part of the hub element
3 Second part of the hub element (spigot)
4 Cylindrical section (sleeve section)
5 Bearing arrangement
6 Flange section
7 Face side
8 Means for centering
9 Connection means
10 Connection section
11 Rib 12 Axially recessed area
13 Radially extending end section
14 Bearing outer ring
15 Axially extending cylindrical section
16 Bearing inner ring
17 Bearing inner ring
18 Wheel
19 Axle
20 Stud bolt
a Axial direction
r Radial direction

The invention claimed is:

1. A wheel bearing unit for a vehicle wheel, the bearing unit comprising:
 a bearing; and
 a hub element including a first part having an axially extending cylindrical section supported by the bearing and a radially extending flange section for fixing one of the vehicle wheel and a brake disk at a face side of the flange section, a second part including a plurality of flaps extending in an axial direction and configured to center one of a wheel rim of the vehicle wheel and the brake disk, and connection means for connecting the first part and the second part, wherein
 the second part has a plurality of connection sections extending in a radial direction and the connection means connect the connection sections of the second part to the radially extending flange section of the first part.

2. The wheel bearing unit according to claim 1, wherein the flaps extending in the axial direction and the connection sections extending in the radial direction are arranged alternately in the circumferential direction of the second part.

3. The wheel bearing unit according to claim 2, wherein at least one of the flaps and the connection sections are cold formed by bending a sheet metal base part.

4. The wheel bearing unit according to claim 1, wherein the first part and the second part are formed of sheet metal.

5. The wheel bearing unit according to claim 4, wherein the sheet metal is one of a ferrous metal, a non-ferrous metal, and a combination of a ferrous metal and a non-ferrous metal.

6. The wheel bearing unit according to claim 1, wherein the face side of the flange section has axially protruding ribs for contacting the one of the vehicle wheel rim and the brake disk and axially recessed areas arranged in a circumferential direction between the ribs, the connection sections being arranged in the recessed areas.

7. The wheel bearing unit according to claim 6, wherein the number of ribs is at least equal to a number of connection points used to fix the one of the wheel rim and the brake disk to the flange section.

8. The wheel bearing unit according to claim 1, wherein the bearing has a bearing ring and the axially extending cylindrical section of the first part has a radially extending end section forming an axial stop for the bearing ring.

9. The wheel bearing unit according to claim 1, wherein the bearing has a bearing ring and the second part has an axially extending cylindrical section forming an axial stop for the bearing ring.

10. The wheel bearing unit according to claim 1, wherein the connection means for connecting the first part and the second part include mechanical fasteners.

11. The wheel bearing unit according to claim 1, wherein the connection means for connecting the first part and the second part is a weld seam produced by means of an energy welding process.

12. The wheel bearing unit according to claim 1, wherein the bearing includes at least one stationary inner ring and at least one outer ring which can rotate relative to the at least one inner ring.

13. The wheel bearing unit according to claim 1, wherein the bearing is a double row angular contact bearing.

* * * * *